US007500775B2

(12) United States Patent
Ladouceur et al.

(10) Patent No.: US 7,500,775 B2
(45) Date of Patent: Mar. 10, 2009

(54) SYSTEM AND METHOD FOR PROVIDING AMBIENT LIGHT TO A DISPLAY IN AN ELECTRONIC DEVICE

(75) Inventors: Norman Ladouceur, Waterloo (CA); Jason Griffin, Kitchener (CA); Robert Lowles, Waterloo (CA)

(73) Assignee: Research in Motion Limited, Waterloo, Ontario (CA)

( * ) Notice: Subject to any disclaimer, the term of this patent is extended or adjusted under 35 U.S.C. 154(b) by 0 days.

(21) Appl. No.: 11/738,689

(22) Filed: Apr. 23, 2007

(65) Prior Publication Data

US 2007/0200972 A1   Aug. 30, 2007

Related U.S. Application Data

(63) Continuation of application No. 11/258,112, filed on Oct. 26, 2005, now Pat. No. 7,213,955.

(51) Int. Cl.
*F21V 7/04* (2006.01)
(52) U.S. Cl. .................. 362/557; 362/192; 362/561; 362/602; 362/613
(58) Field of Classification Search ............ 362/192, 362/557, 561, 602, 613; 349/61, 63, 65, 349/68
See application file for complete search history.

(56) References Cited

U.S. PATENT DOCUMENTS 3,562,746 A * 2/1971 Aron .................. 340/815.43

| 5,019,749 | A | 5/1991 | Ito |
| 5,339,178 | A | 8/1994 | Phelps, III et al. |
| 5,754,262 | A | 5/1998 | Lengyel |
| 6,172,725 | B1 | 1/2001 | Lengyel |
| 6,369,866 | B1 | 4/2002 | Rai et al. |
| 6,650,382 | B1 | 11/2003 | Sumida et al. |
| 6,795,137 | B1 | 9/2004 | Whitted et al. |
| 2002/0050974 | A1 | 5/2002 | Rai et al. |
| 2002/0080105 | A1 | 6/2002 | Sato et al. |
| 2003/0201702 | A1 | 10/2003 | Kim et al. |

FOREIGN PATENT DOCUMENTS

| GB | 2 370 404 A | 6/2002 |
| JP | 08122534 | 5/1996 |
| JP | 2000258766 | 9/2000 |
| JP | 2001043713 | 2/2001 |
| JP | 2002131745 | 5/2002 |

* cited by examiner

*Primary Examiner*—Sandra L. O'Shea
*Assistant Examiner*—Meghan K. Dunwiddie
(74) *Attorney, Agent, or Firm*—McCarthy Tétrault LLP

(57) ABSTRACT

The invention provides a device and method for providing backlight to a display in an electronic device. The device comprises: a housing; an ambient light collector; a backlight panel; a shutter; and a photodetector. The ambient light collector has: a body having the first end and a second end, which is located within the housing. The body receives ambient light from around the electronic device and transmits it to the second end. The body is shaped to direct the ambient light from the first end towards the second end and has a turn in it between the first and second ends. In the body, each conduit has an upper end and a lower end, the upper end being connected to the second end of the body, and each conduit extending downward and away from the second end.

19 Claims, 7 Drawing Sheets

SYSTEM AND METHOD FOR PROVIDING AMBIENT LIGHT TO A DISPLAY IN AN ELECTRONIC DEVICE

This is a continuation patent application of U.S. patent application Ser. No. 11/258,112 filed Oct. 26, 2005 now U.S. Pat. No. 7,213,955.

The invention described herein relates to a system and method for enhancing the visibility of elements generated on a display in an electronic device. In particular, the invention described herein relates to using ambient light as a backlight for a display, such as a liquid crystal display (LCD) in an electronic device.

BACKGROUND OF THE INVENTION

Current wireless handheld mobile communication devices perform a variety of functions to enable mobile users to stay current with information and communications, such as e-mail, corporate data and organizer information while they are away from their desks. A wireless connection to a server allows a mobile communication device to receive updates to previously received information and communications. The handheld devices optimally are lightweight, compact and use low amounts of power to facilitate usage by persons on the go. As such, the devices are portable and will be used in a variety of environments, e.g. at the office, at home, in a restaurant, outside at night, outside during the day, etc. Such handheld devices invariably have a display thereon to provide visual indicators (graphics, text, pictures, video etc.) generated by the device to a user. Frequently, liquid crystal displays (LCDs) are used, as they are relatively inexpensive devices and do not use an excessive amount of power. The displays are typically provided as a reflective, transmissive or transreflective LCD panel.

However, reading displays on prior art devices can be difficult as ambient conditions surrounding the device change. LCDs in particular use backlighting to increase their readability. However, there may be dynamic ambient conditions where the backlight level should be increased for better readability or decreased for power savings. For example, if a user using a device having a non-reflective screen is first used in a darkened environment and then moves to a brighter ambient environment, the backlight level for the display may be too bright in the darkened area and not bright enough in the brighter area. There are existing prior art systems which adjust backlight conditions, however, they require power to adjust backlight levels.

There is a need for a system and method which addresses deficiencies in the prior art of adjusting the backlight level for a display in an electronic device.

BRIEF DESCRIPTION OF THE DRAWINGS

The invention will now be described, by way of example only, with reference to the accompanying drawings, in which.

DETAILED DESCRIPTION OF AN EMBODIMENT

Figure 1:
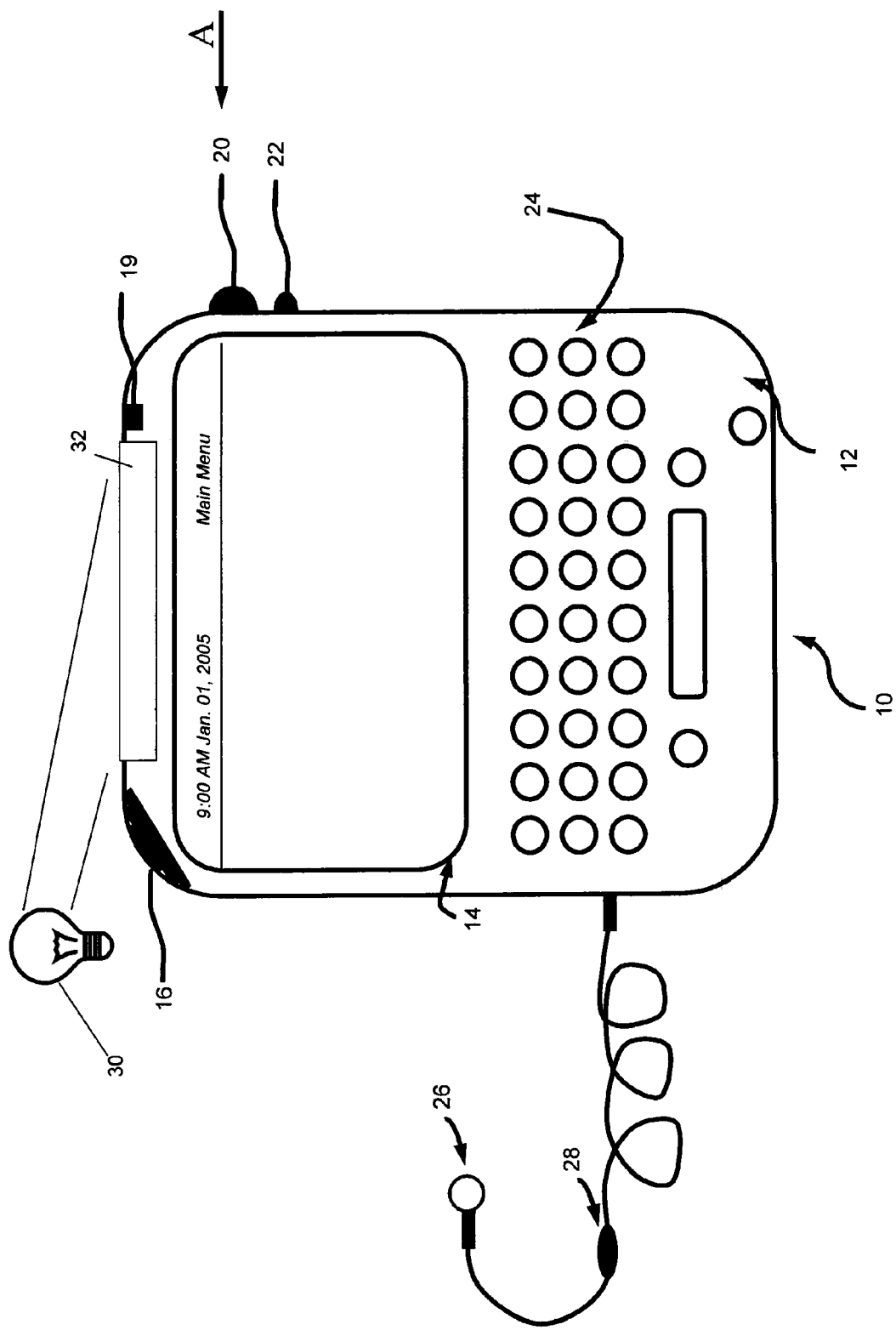
FIG. 1 is a schematic representation of an electronic device having a housing, a display and a backlight system in accordance with an embodiment.

The description which follows and the embodiments described therein are provided by way of illustration of an example or examples of particular embodiments of the principles of the present invention. These examples are provided for the purposes of explanation and not limitation of those principles and of the invention. In the description which follows, like parts are marked throughout the specification and the drawings with the same respective reference numerals.

In a first aspect of an embodiment, a method of providing backlight for a display in an electronic communication device is provided. The method comprises: collecting ambient light from outside the device through a lens; transmitting the ambient light from the lens to a backlight system for the display; and dispersing the ambient light through the backlight system.

The method may further comprise: providing an active light to the backlight system; and selectively blocking the active light from being transmitting out of the lens.

The method may further comprise providing a movable reflector to direct the ambient light towards the lens.

In a second aspect, an electronic device having backlighting for a display is provided. The device comprises: a housing for the display; and a backlight system for the display. The backlight system comprises: a lens to collect ambient light from outside the device; a backlight panel in communication with the lens; and an active light system connected to the backlight panel. The panel is located within the housing and underneath the display and the panel is adapted to disperse the ambient light through the backlight panel.

The device may further comprise a reflector locatable about the lens to reflect additional ambient light into the lens. Also, the reflector may be mounted to the housing. Also, the reflector may be movable from first position covering the lens to a second position reflecting the additional ambient light into the lens.

Alternatively, the device may have a shutter locatable between the active light system and an exterior end of the lens, the shutter providing a barrier for light from the active light system from being transmitted out of the lens. In the device, the shutter may comprise a liquid crystal element.

In the device, the collector may comprise a lens connected to a body connected to a light conduit, wherein the lens is locatable in the opening of the housing and the light conduit connects to the backlight panel.

In the device, the lens, body and light conduit may be are shaped to channel light towards the anterior end of the light conduit.

In the device, the anterior end of the ambient light collector may correspond to an end of the light conduit.

In the device, the active light system and the anterior end of the ambient light collector may be connected to the top end of the backlight panel.

In another aspect, an electronic device providing backlighting for a display is provided. The device comprises: a housing for the display and the device, the housing having a first opening for the display and a second opening; an ambient light collector; a backlight panel having a body shaped with a first end and a top, the first end connected to light conduits of the ambient light collector at its lower end, the panel allowing the ambient light to be received from the light conduit and to be transmitted out through the top towards the display; active backlights selectively providing light to the backlight panel; a shutter locatable between the active lights and a first end of the ambient light collector, the shutter selectively providing a barrier for blocking light from the active backlights from being transmitted out of the ambient light collector; and a photodetector to detect the ambient light and to provide a signal to control positioning of the shutter. The ambient light collector has: a body having the first end and a second end, the body located within the housing with the first end located in the second opening of the housing, the body receiving ambient light from around the electronic device at the first end and transmitting the ambient light to the second end, the body shaped to direct the ambient light from the first end towards the second end, the body having a turn in it between the first and second ends, the first end of the body shaped to be flush in the second opening of the housing when the body is installed in the device; and light conduits that extend from the second end, each conduit having an upper end and a lower end, the upper end connected to the second end of the body, and each conduit extending downward and away from the second end. The backlight panel has a body shaped with a first end and a top, the first end is connected to the each conduit at its lower end, the panel allows the ambient light to be received from the light conduits and to be transmitted out through the top towards the display.

In other aspects various combinations of sets and subsets of the above aspects are provided.

Referring to FIG. 1, an electronic device for receiving electronic communications in accordance with an embodiment of the invention is indicated generally at 10. In the embodiment, electronic device 10 is based on a computing platform having functionality of an enhanced personal digital assistant with cellphone and e-mail features. However, it will be understood that electronic device 10 can be based on construction design and functionality of other electronic devices, such as smart telephones, desktop computers pagers or laptops having telephony equipment. In the embodiment, electronic device 10 includes, a housing 12, which frames a LCD 14, speaker 16, and LED indicator 19, a trackwheel 20, an ESC ("escape") key 22, keypad 24 and a telephone headset comprised of an ear bud 26 and a microphone 28. Trackwheel 20 and ESC key 22 can be inwardly depressed along the path of arrow "A" as a means to provide additional user-input. Device 10 also has backlight system 30, which operates to provide ambient light from external light source 32 to the interior of device 10 to provide backlighting to display 14.

It will be understood that housing 12 can be made from any suitable material as will occur to those of skill in the art and may be suitably formed to house and hold all components of device 10.

Device 10 is operable to conduct wireless telephone calls, using any known wireless phone system such as a Global System for Mobile Communications ("GSM") system, Code Division Multiple Access ("CDMA") system, Cellular Digital Packet Data ("CDPD") system and Time Division Multiple Access ("TDMA") system. Other wireless phone systems can include Bluetooth and the many forms of 802.11 wireless broadband, like 802.11a, 802.11b, 802.11g, etc. that can support voice. Other embodiments include Voice over IP (VoIP) type streaming data communications that can simulate circuit switched phone calls. Ear bud 26 can be used to listen to phone calls and other sound messages and microphone 28 can be used to speak into and input sound messages to device 10.

Figure 2:
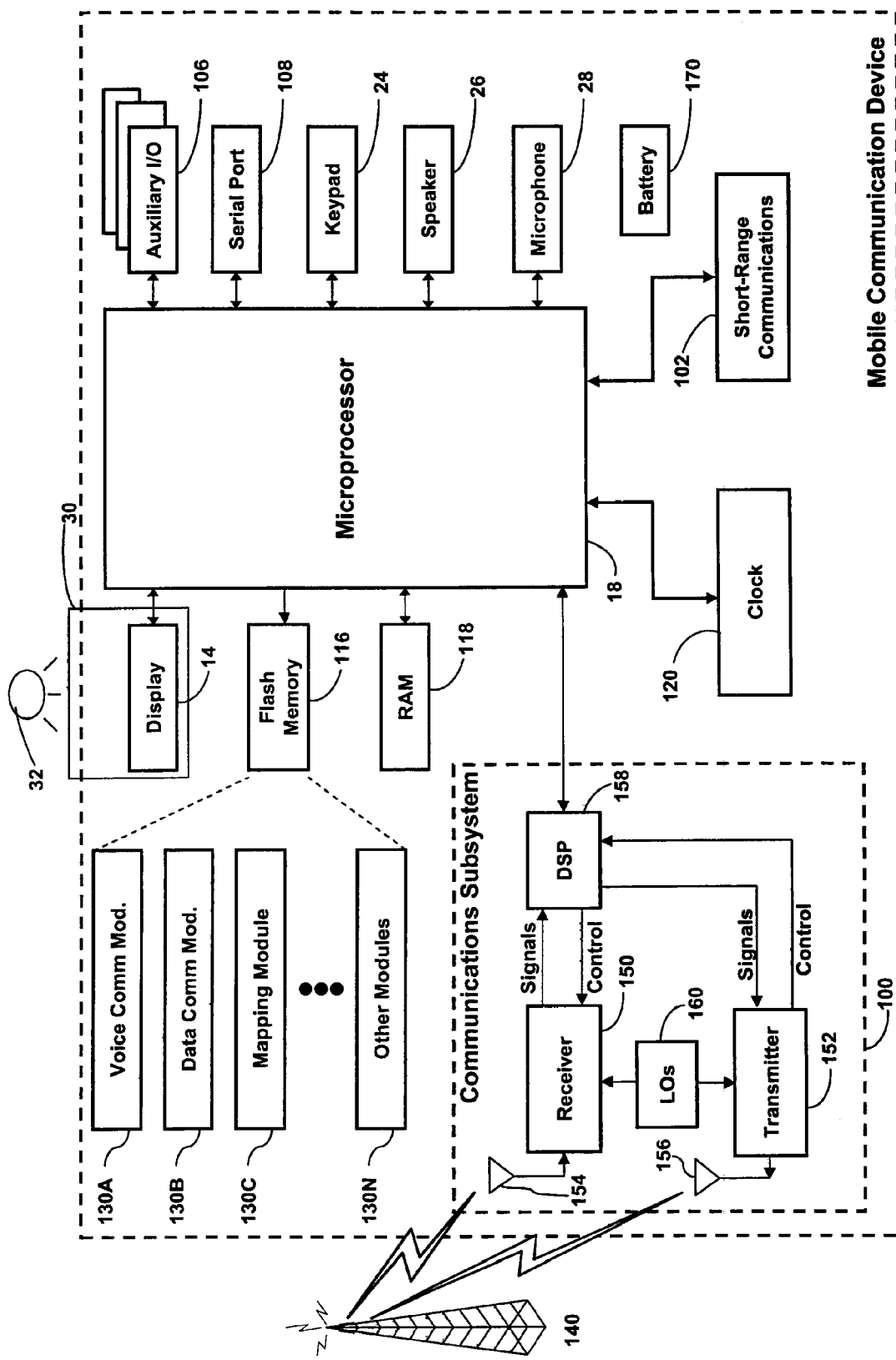
FIG. 2 is a block diagram of certain internal components in the device in FIG. 1.

Referring to FIG. 2, functional elements of device 10 are provided. The functional elements are generally electronic, structural or electromechanical devices. In particular, microprocessor 18 is provided to control and receive almost all data, transmissions, inputs and outputs related to device 10. Microprocessor 18 is shown as being coupled to keypad 24, display 14 and other internal devices. Microprocessor 18 controls the operation of the display 14, as well as the overall operation of the device 10, in response to actuation of keys on the keypad 24 by a user. Exemplary microprocessors for microprocessor 18 include Data 950 (trade-mark) series microprocessors and the 6200 series microprocessors, all available from Intel Corporation.

In addition to the microprocessor 18, other internal devices of the device 10 are shown in FIG. 2. These include: a communication subsystem 100; a short-range communication subsystem 102; keypad 24 and display 14, with other input/output devices including a set of auxiliary I/O devices 106, a serial port 108, a speaker 16 and a microphone port 112 for microphone 28; as well as memory devices including a flash memory 116 (which provides persistent storage of data) and random access memory (RAM) 118; clock 120 and other device subsystems (not shown). The device 10 is preferably a two-way radio frequency (RF) communication device having voice and data communication capabilities. In addition, device 10 preferably has the capability to communicate with other computer systems via the Internet.

Operating system software executed by the microprocessor 18 is preferably stored in a computer readable medium, such as flash memory 116, but may be stored in other types of memory devices, such as read only memory (ROM) or similar storage element. In addition, system software, specific device applications, or parts thereof, may be temporarily loaded into a volatile store, such as RAM 118. Communication signals received by the mobile device may also be stored to RAM 118.

Microprocessor 18, in addition to its operating system functions, enables execution of software applications on device 10. A set of software applications 130 that control basic device operations, such as a voice communication module 130A and a data communication module 130B, may be installed on the device 10 during manufacture or downloaded thereafter. Cell mapping module 130C may also be installed on device 10 during manufacture. As well, additional software modules, illustrated as an other software module 130N, which may be, for instance, a personal information manager (PIM) application, may be installed during manufacture or downloaded thereafter into device 10. PIM application is preferably capable of organizing and managing data items, such as e-mail messages, calendar events, voice mail messages, appointments, and task items. Data associated with each application can be stored in flash memory 116.

Communication functions, including data and voice communications, are performed through the communication subsystem 100 and the short-range communication subsystem 102. Collectively, subsystem 102 and subsystem 100 provide the signal-level interface for all communication technologies processed by device 10. Various applications 130 provide the operational controls to further process and log the communications. Communication subsystem 100 includes receiver 150, transmitter 152 and one or more antennas, illustrated as receive antenna 154 and transmit antenna 156. In addition, communication subsystem 100 also includes processing module, such as digital signal processor (DSP) 158 and local oscillators (LOs) 160. The specific design and implementation of communication subsystem 100 is dependent upon the communication network in which device 10 is intended to operate. For example, communication subsystem 100 of the device 10 may be designed to operate with the Mobitex (trade-mark), DataTAC (trade-mark) or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communication Service (PCS), Global System for Mobile Communication (GSM), etc. Other types of data and voice (telephonic) networks, both separate and integrated, may also be utilized with device 10. In any event, communication subsystem 100 provides device 10 with the capability of communicating with other devices using various communication technologies, including instant messaging (IM) systems, text messaging (TM) systems and short message service (SMS) systems.

In addition to processing communication signals, DSP 158 provides control of receiver 150 and transmitter 152. For example, gains applied to communication signals in receiver 150 and transmitter 152 may be adaptively controlled through automatic gain control algorithms implemented in DSP 158.

In a data communication mode a received signal, such as a text message or web page download, is processed by the communication subsystem 100 and is provided as an input to microprocessor 18. The received signal is then further processed by microprocessor 18 which can then generate an output to the display 14 or to an auxiliary I/O device 106. A device user may also compose data items, such as e-mail messages, using keypad 24, a thumbwheel associated with keypad 24, and/or some other auxiliary I/O device 106, such as a touchpad, a rocker switch, a separate thumbwheel or some other input device. The composed data items may then be transmitted over communication network 140 via communication subsystem 100. Subsystem 100 may also detect when it is out of communication range for its remote systems.

In a voice communication mode, overall operation of device 10 is substantially similar to the data communication mode, except that received signals are output to speaker 16 and signals for transmission are generated by microphone 28. Alternative voice or audio I/O subsystems, such as a voice message recording subsystem, may also be implemented on device 10. In addition, display 14 may also be utilized in voice communication mode for example to display the identity of a calling party, the duration of a voice call, or other voice call related information.

Short-range communication subsystem 102 enables communication between device 10 and other proximate systems or devices, which need not necessarily be similar devices. For example, the short-range communication subsystem may include an infrared device and associated circuits and components, or a Bluetooth (trade-mark) communication module to provide for communication with similarly-enabled systems and devices.

Powering the entire electronics of the mobile handheld communication device is power source 170. Preferably, the power source 170 includes one or more batteries. More preferably, the power source 170 is a single battery pack, especially a rechargeable battery pack. A power switch (not shown) provides an "on/off" switch for device 10. Upon activation of the power switch an application 130 is initiated to turn on device 10. Upon deactivation of the power switch, an application 130 is initiated to turn off device 10. Power to device 10 may also be controlled by other devices and by software applications 130.

During operation of one or more applications 130, various text and graphics are generated and displayed on display 14. To enhance readability of the elements generated thereon, backlight system 30 provides backlighting to display 14. Light for backlight system 30 is obtained from internally generated light from controlled light sources and from ambient light 32 collected from the environment around device 10. Light from both sources are collected and channelled to the appropriate back sections of display 14 using lighting conduits. Further detail on backlight system 30 is provided below.

Figure 3:
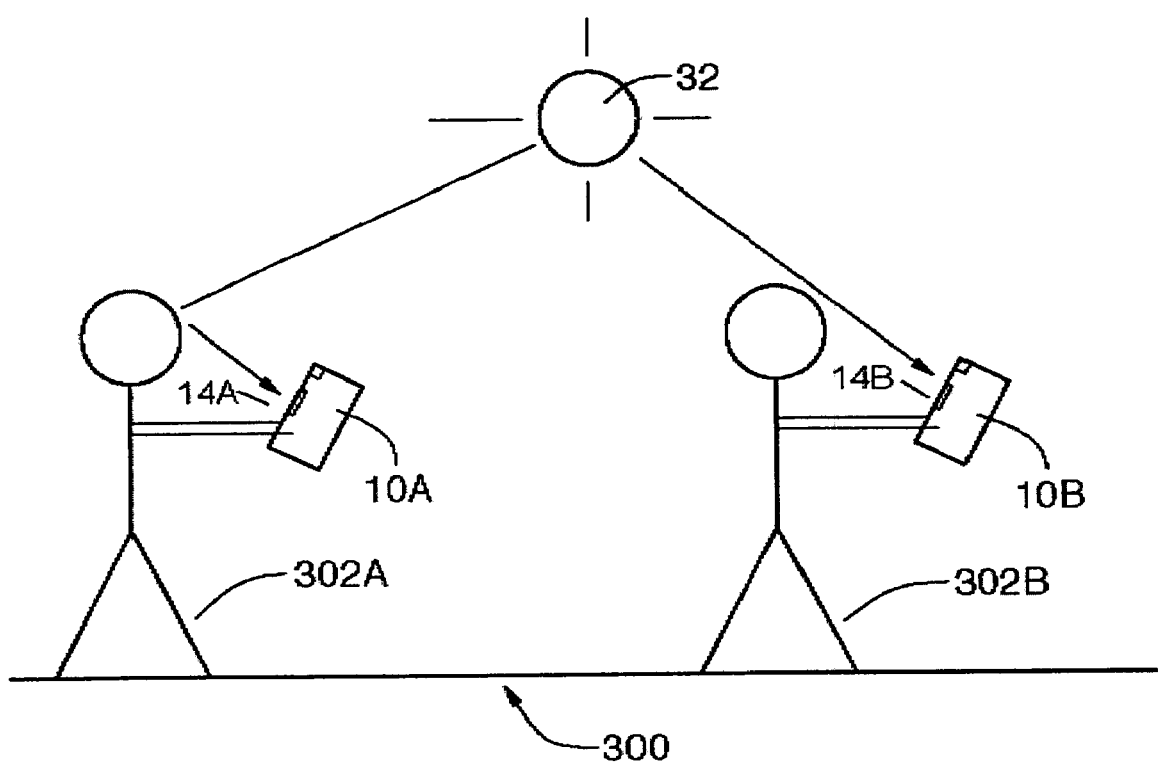
FIG. 3 is a schematic representation of two of the devices of FIG. 1 shown in use in a location having ambient lighting.

Referring to FIG. 3, ambient environment 300 is shown wherein two devices 10A and 10B of an embodiment are being used by persons 302A and 302B respectively. Ambient light source 32 is located between persons 302A and 302B; source 32 is may be the sun or a mounted artificial light. Device 10A is located between person 302A and ambient light source 32. Person 302B is located between device 10B and ambient light source 32. Even in environment 300, devices 10A and 10B have different lighting situations, providing different visibility conditions for their respective displays 14A and 14B. As display 14A of device 10A faces away from source 32, person 302A is viewing display 14A with indirect reflected light from source 32. Display 14B receives direct light from source 32. Indirect light from source 32 is less bright than direct light. As such, the ambient contrast for display 14A is better than the contrast for display 14B, making display 14A easier to read.

Generally, there are two methods of improving the ambient contrast for a display, such as display 14A and 14B: either decrease its ambient light or increase its backlighting. Backlighting provides a light source emanating from behind a transmissive display (such as an LCD). Known backlighting systems utilize powered light sources. However, such sources consume battery power. The embodiment collects and redirects ambient light, such as light from source 32, as a backlight for its display.

Figure 4:
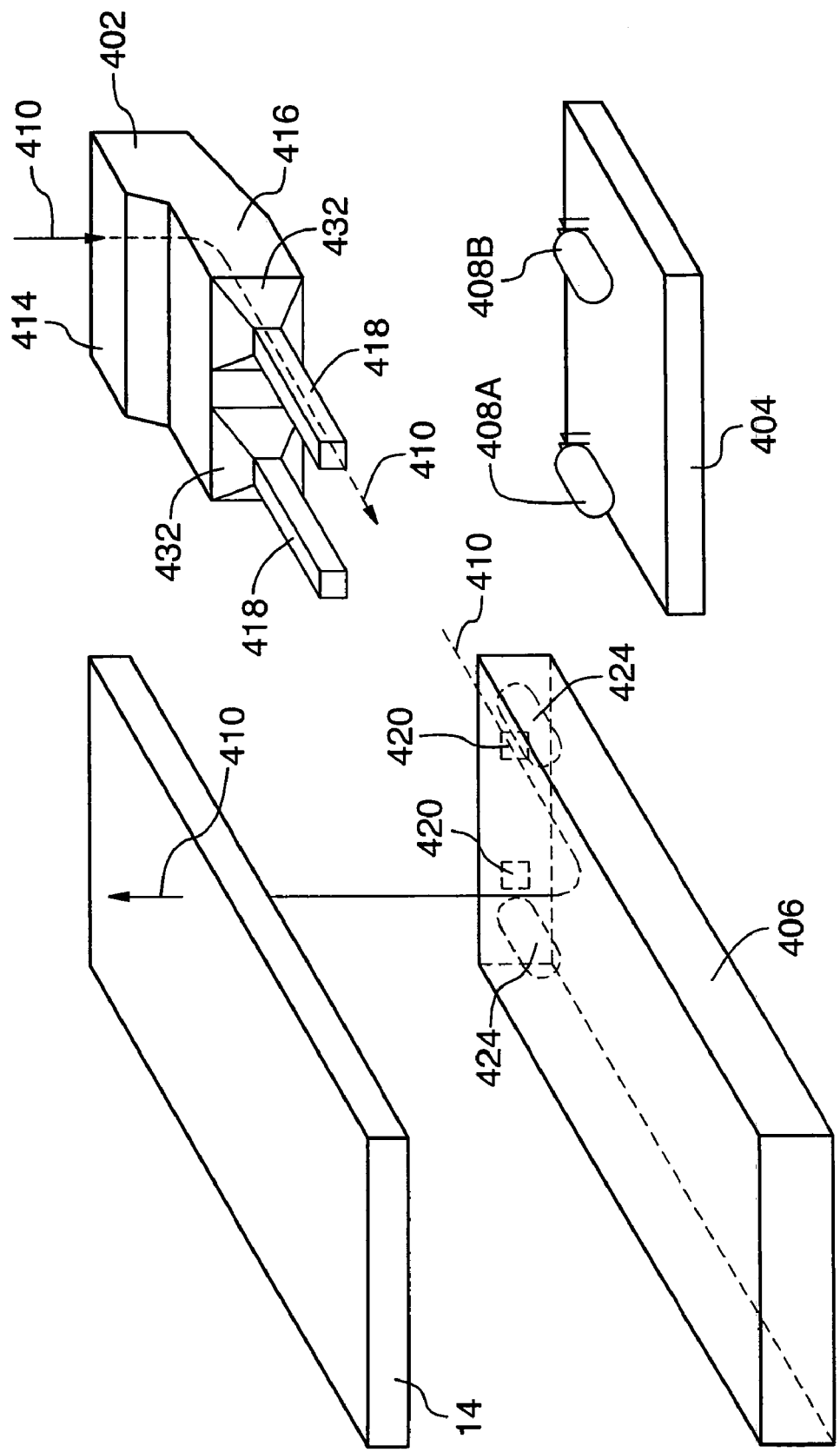
FIG. 4 is a schematic representation of a side view of exploded elements of the device of FIG. 1 showing the housing, the display and the backlight system.
Figure 5:
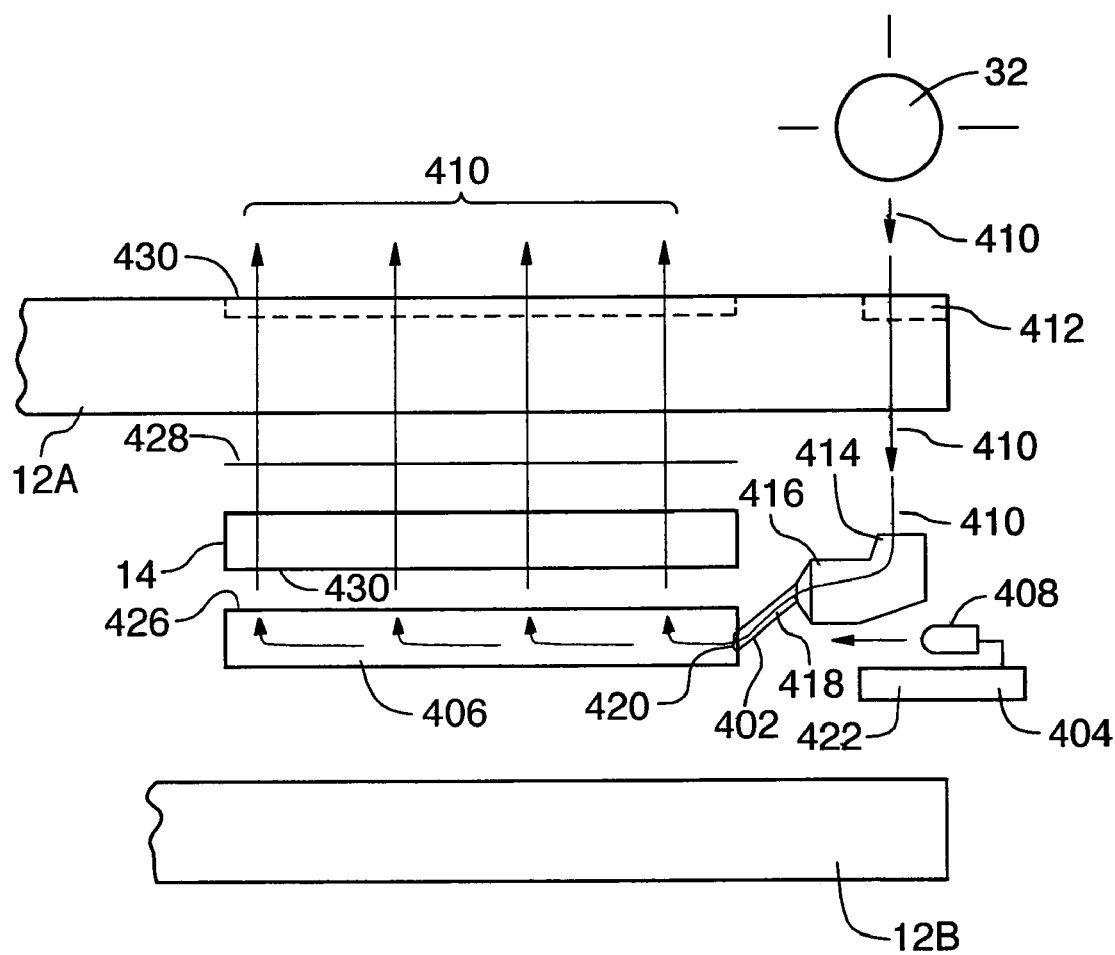
FIG. 5 is a schematic representation of a top perspective view of exploded elements of the device of FIG. 1 showing the housing, the display and the backlight system.

Referring to FIGS. 4 and 5 further aspects of an embodiment are shown. In particular, backlight system 30 has three main sections: ambient light collector section 402; active light generator section 404 and backlight panel 406. Both the ambient light collector section 402 and the active light generator section 404 are connected to the panel 406. The connections linking sections 402 and 404 to panel 406 provide a physical transmission channel for light to be transmitted from either section to the panel 406. Ambient light collector section 402 collects ambient light from outside of device 10 and transmits the collected ambient light to backlight panel 406. Active light generator section 404 houses light sources 408 and transmits light generated by the active light sources 408 to backlight panel 406. Backlight panel 406 distributes the light received from sections 402 and 404 and disperses it through the back panel of display 14, through its panels, providing backlighting to display 14. Generally, to assist in the transmission of light, ambient light collector section 402 and backlight panel 406 are each a shaped volume that collects light energy at one end, transmits the energy "forward" through an internal channel in the volume and provides the transmitted light energy out a second end. Each section may be formed from a transparent or translucent material, allowing light to be transmitted forward within its volume. Clear plastic or lexan (trade-mark) may be used to form light transmissive sections of backlight system 30. The interior sides of the sections may be coated with a light reflective material in order to assist in the internal transmission of the light energy. Further, dimensions, angles and contours within the sections may be formed to facilitate the forward transmission of the light energy and to reduce the amount of light reflected backwards towards the source following known light transmission principles. Arrows 410 show a general path of ambient light received by ambient light collector section 410 as the light is transmitted through the sections of backlight system 30 and then through display 14. Further detail on each section is provided below.

Ambient light section 402 comprises lens 414, body section 416 and light transmission conduits 418, forming one integral body. Each section may be formed separately, then joined, melted or welded together at the mating seams of the sections using techniques known in the art. Having an integral body is preferable, as there can be loss of light energy as a light is transmitted between through boundaries between sections. When device 10 is assembled, ambient light collector section fits into upper housing 12A such that lens 414 mates with opening 412 in upper housing 12A. Opening 412 spans a top portion of upper housing 12A along its front face and top edge. In the embodiment, lens 414 is generally an oblong body, having a flat upper surface which mates with opening 412. Body section 416 is a shaped oblong. Lens 414 is located at one end of the shaped oblong. Exterior surfaces of body section 416 are defined to reflect light received from lens 414 through body section 416. In the embodiment, a lower surface of the shaped oblong underneath lens 414 is shaped to provide a taper to allow light received through lens 414 to be directed through a turn towards the length of the body of section 416. At the end of body section 416 are two further tapers 432 which collect the received light and concentrate it towards light transmission conduits 418. Light transmission conduits 418 are generally columniform. Each conduit is attached at a downward cant to tapers 432, allowing the transmitted ambient light to be further bent and directed towards backlight panel 406. The exterior ends of transmission conduits 418 are mated against pads 420 of backlight panel 406. It will be appreciated that in other embodiments a different number of conduits 418 may be provided. Alternatively, the conduits may be removed.

Upper opening 412 is located above opening 430 in housing 12A. As such, when device 10 is being held generally upright, lens 414 is also facing generally upwardly, thereby placing it in a favourable orientation to receive ambient light when device 10 is being held in a generally upright manner. Lens 414 may be mounted at other locations in device 10, such as on the front, below display 14, on a side of device 10 or on the back of device 10. The specific location will have different light collecting characteristics, depending on the orientation of device 10. In other embodiments, several lens may be provided in different locations on device 10. As noted above, the general purpose of ambient light collector section 402 is to receive light through lens 414 and transmit it to backlight section 406. As such, in other embodiments, different shapes, numbers and sizes for each part of each section may be provided, as long as the light section has the capability of collecting ambient light and transmitting it towards a backlight panel for a display.

Active light section 404 has two LEDs 408 mounted on platform 422. The electronic control circuit controlling LEDs 408 is not shown. LEDs 408 provide an active light source for backlight system 30. In other embodiments, other technologies may be used for the active light source, such as lamps, and a different number of LEDs may be used. When backlight system is assembled, LEDs 408 are mated to complementary cavities 424 in backlight panel 406 to make a generally snug fit within backlight panel 406. When LEDs 408 are activated by the control circuit, the light energy emitted therefrom enters backlight panel 406, which is then transmitted through LCD 14. The light path is generally shown by arrows 410.

Backlight panel 406 is a light spreading panel which is shaped to mate against the back face of display 14. It is shown in this embodiment as being generally oblong; however, other shapes may be implemented. Light received from either ambient light collector section 402 through transmission pads 420 or LEDs 408 through cavities 422 is received into the interior of panel 406 then is dispersed within panel 406 and then transmitted to display 14 through top surface 426. Panel 406 may have interior features to reflect light upward. Panel 406 may have a tapered block construction and may have approximately a trapezoidal form to more evenly distribute the light throughout top surface 426.

Display 14 is a preferably full-colour device. More preferably, display 14 is a field sequential (FS) LCD—an LCD that reduces or obviates a need for colour filters. Alternatively, the LCD may contain colour filters in which case a white light source may be used. In FIGS. 4 and 5, the electronics controlling display 14 are not shown. Different types of LCDs 14 have different light transmission/reflection properties. If the surface of LCD 14 is more reflective, e.g. via a reflective coating, it generally has good ambient light readability. If the surface of LCD 14 is more transmissive, then more light can pass through it (in both directions). This characteristic generally produces a darker image, requiring backlighting to improve readability. Current systems incorporating backlighting for LCDs provide lighting of at least about 100 candella in light intensity. The amount of light provided by ambient light collector section 402 will vary on the intensity of the ambient light around device 10 and the positioning of device 10 relative to section 402 therein. When mounted into device 10, display 14 is placed behind clear protective cover 428 and is mounted to mate with cavity 430 in housing 12A. Backlight panel 406 is positioned immediately underneath display 14, such that surface 426 is placed against or near the bottom surface 430 of display 14. After all sections of backlight system 30 are assembled, housing 12B is mated to housing 12A to enclose display 14 and backlight system 30 within device 10. In other embodiments, LEDs 408 may be situated on a side or on the bottom of panel 406.

Figure 6:
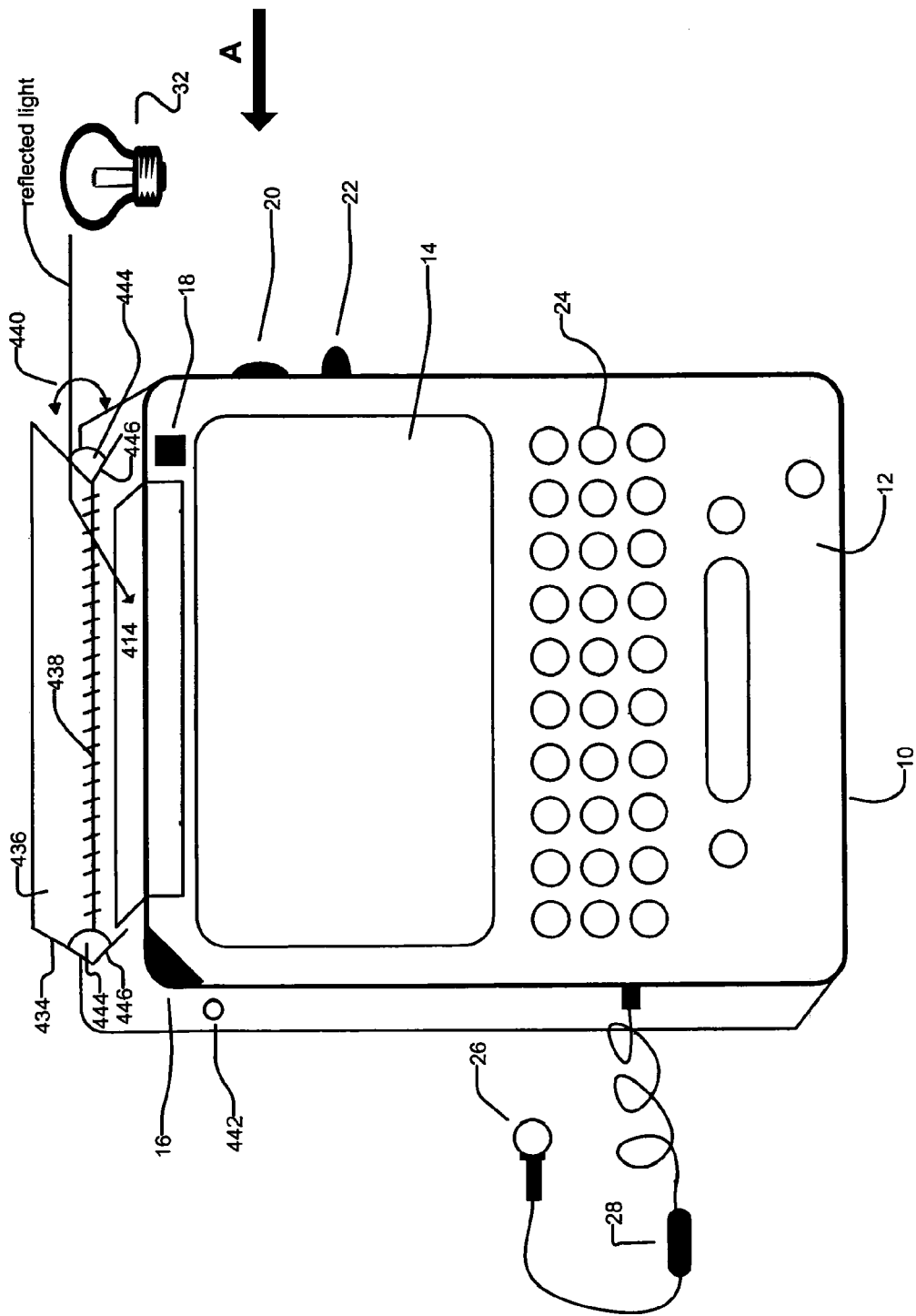
FIG. 6 is a schematic representation of a top perspective view of a device having a housing, a display, a backlight system and a reflector for the backlight system in accordance with another embodiment.

Referring to FIG. 6 another embodiment is shown comprising device 10 with backlight system 30 and lens 414 in opening 412. To assist in collecting further ambient light into lens 414, reflector 434 is provided as an moveable reflector to reflect towards lens 414 some light energy that would otherwise not be directed towards it. Generally, reflector 434 is a generally flat flap having an interior surface 436 which is reflective. Reflector 434 is attached to device 10 at its lower end through hinge 438 and is rotatable through from a first position where it is resting flat against the top cover of device 10, through a plurality of positions along arc 440. Distal end of reflector 434 may be grabbed as reflector 434 is rotated. Alternately, reflector 434 may be attached to dial 442 in housing 12 through a rod or gearing mechanism known in the art. As dial 442 is rotated, reflector 434 is rotated through its positions. Side reflectors 444 with slits 446 in housing 12 may be provided as well. In other embodiments, other shapes for reflectors may be provided, including reflectors which expand in area as they are deployed by having additional flaps attached to parts of the reflector. One or more surfaces on reflector 434 may be concave in shape to further concentrate light towards lens 414. Other reflectors may be placed in other location on device 10, such as on the front. It is preferable to have the reflector located in relatively close proximity to its associated lens 414. Other embodiments of reflector 434 may be attached to device 10 in other mechanical systems. For example, a reflector be extended from a slot in device 10. Alternatively, a reflector may be detachable from device 10. One or more reflectors may be placed on device 10. In other embodiments, the shape of housing 12 may be formed to provide a surface which will reflect some ambient light into lens 414, through a ridge, hump, or raised section on housing 12.

Figure 7:
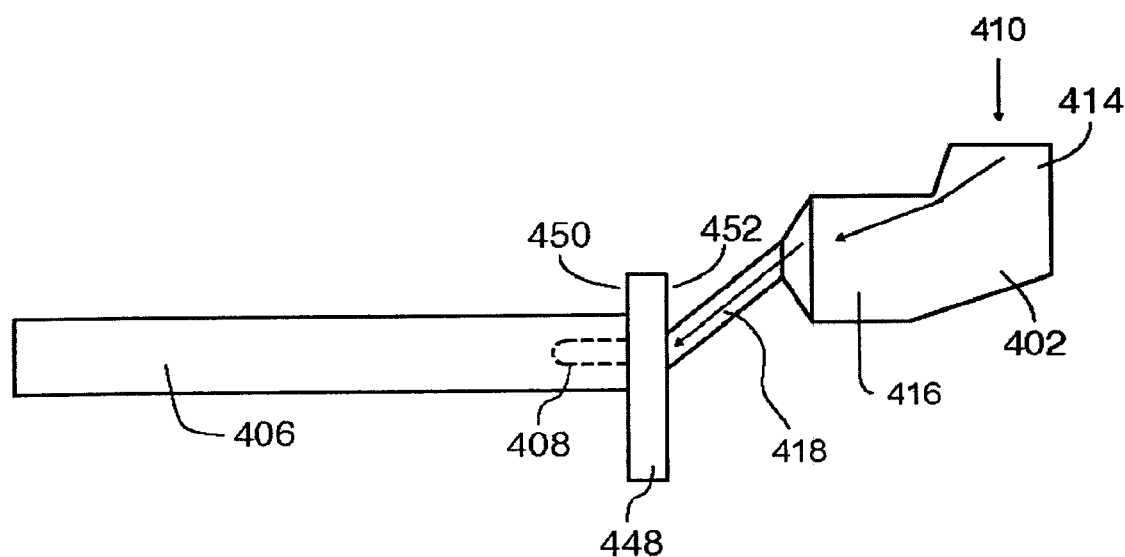
FIG. 7 is schematic representation of a side cross-section view of another backlight system having a shutter in accordance with yet another embodiment.

Referring to FIG. 7 another embodiment is shown comprising device 10 with backlight system 30. In order to enhance operation of active light generator section 404, shutter 448 is provided to prevent light generated from light section 404 from emanating out from lens 412 of ambient light collector section 402. Shutter 448 is preferably reflective on its side 450 facing active light generator section 404. Shutter 448 may be located almost anywhere between light section 404 and ambient light collector section 402 or even within ambient light collector section 402. Shutter 448 may be removable (e.g. it may be mechanically or manually raised, lowered or moved into position) or it may a selectively transmissive device, such as an electronically controlled shutter, such as an liquid crystal (LC) shutter. As shown, exterior ends of conduits 418 of ambient light collector section 402 abut against face 452 of shutter 448. LED 408 of active section 404 is shown in situ within cavity 424 of backlight panel 406. Other elements of active section 404 are not shown. Shutter 448 is shown as implemented as an LC in a screen wherein, when activated, elements of the LC in the screen are energized to form an opaque region, blocking light from transmitting from active light generator section 404 through the shutter and out of the lens. Control for the shutter may be provided through software operating an electronic controller. A photodetector may also be provided in device 10 to provide an indicator of how much ambient light is present and, based on that information, whether to activate or deactivate the shutter.

The present invention is defined by the claims appended hereto, with the foregoing description being merely illustrative of a preferred embodiment of the invention. Those of ordinary skill may envisage certain modifications to the foregoing embodiments which, although not explicitly discussed herein, do not depart from the scope of the invention, as defined by the appended claims.

We claim:

1. An ambient light collector to provide ambient light to a backlight system for a display of a portable electronic device, comprising:
   an integral body having a first end and a second end, said body for installation into said device, for collecting said ambient light from outside said device, for receiving ambient light from around said electronic device at said first end and for transmitting and concentrating said ambient light within said body to said second end; and
   a plurality of conduits for receiving said ambient light from said second end and for transmitting said ambient light away from said second end of said body, each conduit of said plurality of conduits having an upper end and a lower end, said upper end connected to said second end of said body, and said each conduit extending downward and away from said second end.

2. The ambient light collector for a backlight system as claimed in claim 1, wherein said lower end of said each conduit is shaped to mate with a backlight panel of said backlight system to transmit said ambient light from said each conduit to said backlight panel.

3. The ambient light collector for a backlight system as claimed in claim 2, wherein said first end of said body is shaped to be flush in an opening in a housing of said device when said body is installed in said device.

4. The ambient light collector for a backlight system as claimed in claim 3, wherein said body is shaped to direct said ambient light from said first end towards said second end.

5. The ambient light collector for a backlight system as claimed in claim 4, wherein said body has a turn in it between said first and second ends.

6. The ambient light collector for a backlight system as claimed in claim 5, wherein said body is coated with a light reflective material to assist in the internal transmission of said ambient light in said body.

7. The ambient light collector for a backlight system as claimed in claim 6, wherein said each conduit tapers in width in a section between said upper end to said lower end.

8. The ambient light collector for a backlight system as claimed in claim 7, wherein said each conduit has a rectangular cross section.

9. A backlight system for a display of a portable electronic device, comprising:
   an ambient light collector having:
      a body having a first end and a second end, said body receiving ambient light from around said electronic device at said first end and transmitting said ambient light to said second end; and
      a plurality of light conduits extending from said second end, each conduit of said plurality of conduits having an upper end and a lower end, said upper end connected to said second end of said body and said each conduit extending downward and away from said second end;
   a backlight panel having a body shaped with a first end and atop, said first end connected to said each conduit at its lower end, said panel allowing said ambient light to be received from said plurality of light conduits and to be transmitted out through said top towards said display;
   a plurality of active backlights selectively providing light to said backlight panel;
   a shutter locatable between said plurality of active backlights and said first end of said ambient light collector, said shutter selectively providing a barrier for blocking light from said plurality of active backlights from being transmitted out of said first end of said ambient light collector; and
   a photodetector to detect said ambient light and to provide a signal to control positioning of said shutter.

10. The backlight system for a display of a portable electronic device as claimed in claim 9, wherein said plurality of active backlights are located about said first end of said backlight panel.

11. The backlight system for a display of a portable electronic device as claimed in claim 10, wherein said first end of said backlight panel comprises apertures to receive said plurality of active backlights.

12. The backlight system for a display of a portable electronic device as claimed in claim 11, wherein one aperture of said apertures is located beside an area on said first side where said lower end connects with said first side of said backlight panel.

13. The backlight system for a display of a portable electronic device as claimed in claim 9, wherein said plurality of active backlights form part of a module that is mounted in place about said backlight panel.

14. The backlight system for a display of a portable electronic device as claimed in claim 9, wherein said module having said plurality of backlights is mounted on a printed circuit board with said backlight panel.

15. The backlight system for a display of a portable electronic device as claimed in claim 9, wherein said body is shaped to direct said ambient light from said first end towards said second end and said body has a turn in it between said first and second ends.

16. The backlight system for a display of a portable electronic device as claimed in claim 9, wherein said each conduit tapers in width in a section between said upper end to said lower end.

17. The backlight system for a display of a portable electronic device as claimed in claim 9, wherein said first end of said body is shaped to be flush in an opening in a housing of said device when said body is installed in said device.

18. The backlight system for a display of a portable electronic device as claimed in claim 9, further comprising:
   a reflector locatable about said ambient light collector to reflect additional ambient light into said ambient light collector, said reflector mounted to a housing of said electronic device.

19. An electronic device providing backlighting for a display, comprising:
   a housing for said display and said device, having a first opening for said display and a second opening;
   an ambient light collector having:
      a body having a first end and a second end, said body located within said housing with said first end located in said second opening of said housing, said body receiving ambient light from around said electronic device at said first end and transmitting said ambient light to said second end, said body shaped to direct said ambient light from said first end towards said second end, said body having a turn in it between said first and second ends, said first end of said body shaped to be flush in said second opening of said housing when said body is installed in said device; and
      a plurality of light conduits extending from said second end, each conduit of said plurality of conduits having an upper end and a lower end, said upper end connected to said second end of said body, and said each conduit extending downward and away from said second end;
   a backlight panel having a body shaped with a first end and atop, said first end connected to said each conduit at its lower end, said panel allowing said ambient light to be received from said plurality of light conduits and to be transmitted out through said top towards said display;
   a plurality of active backlights selectively providing light to said backlight panel;
   a shutter locatable between said active light system and said first end of said ambient light collector, said shutter selectively providing a barrier for blocking light from said plurality of active backlights from being transmitted out of said ambient light collector; and
   a photodetector to detect said ambient light and to provide a signal to control positioning of said shutter.

* * * * *